(12) United States Patent
Cappeller et al.

(10) Patent No.: US 11,746,919 B2
(45) Date of Patent: Sep. 5, 2023

(54) RELEASE VALVE (71) Applicant: CAPPELLER FUTURA SRL, Cartigliano (IT)

(72) Inventors: Alessandro Cappeller, Cartigliano (IT); Claudio Campagnari, Cartigliano (IT)

(73) Assignee: Cappeller Futura Srl, Cartigliano (IT)

( * ) Notice: Subject to any disclaimer, the term of this patent is extended or adjusted under 35 U.S.C. 154(b) by 0 days.

(21) Appl. No.: 17/618,525

(22) PCT Filed: Jun. 9, 2020

(86) PCT No.: PCT/IT2020/050144
§ 371 (c)(1),
(2) Date: Dec. 13, 2021

(87) PCT Pub. No.: WO2020/250258
PCT Pub. Date: Dec. 17, 2020

(65) Prior Publication Data
US 2022/0243833 A1    Aug. 4, 2022

(30) Foreign Application Priority Data
Jun. 11, 2019   (IT) .................. 102019000008637

(51) Int. Cl.
*F16K 17/196*    (2006.01)
*F17C 13/04*    (2006.01)

(52) U.S. Cl.
CPC ............ *F16K 17/196* (2013.01); *F17C 13/04* (2013.01); *F17C 2205/0332* (2013.01);
(Continued)

(58) Field of Classification Search
CPC ........ F16K 17/196; F16K 17/04; F17C 13/04; F17C 2205/0382; F17C 2205/0394; F17C 2205/0332; F17C 2205/0338
See application file for complete search history.

(56) References Cited

U.S. PATENT DOCUMENTS 3,503,417 A * 3/1970 Todatadahide ...... F16K 17/0433
137/504
3,939,866 A * 2/1976 Pignatelli ............... B60K 15/04
220/203.26
(Continued)

FOREIGN PATENT DOCUMENTS

AU     2012258441        1/2014
DE        2418135 A1 * 10/1975
(Continued)

OTHER PUBLICATIONS

International Preliminary Report on Patentability dated Jun. 8, 2021 From the International Preliminary Examining Authority Re. Application No. PCT/IT2020/050144. (16 Pages).
(Continued)

*Primary Examiner* — Jessica Cahill (57) ABSTRACT

The invention relates to a release valve (100), installable on a container intended to contain a pressurized fluid and capable of maintaining a pressure difference between a first environment (9) and a second environment (90), comprising a housing (8), a first thrust means (3), a closure element (5), and a slider (2), wherein said housing (8) contains at least said slider (2) and said first thrust means (3), wherein said slider (2) comprises a first surface (25) facing the first environment (9), and a second surface (26), facing the second environment (90), and having an area greater than said first surface (25), wherein said closure element (5) is interposed between said second environment (90) and said slider (2), and wherein said first thrust means (3) is positioned between said slider (2) and said housing (8), so as to obtain at least one closed contact profile between said closure element (5) and said second surface (26), wherein said release valve (100) is characterized in that said fluid exerts on said second surface (26) a pressing force greater than the pressing force exerted on said first surface (25), and
(Continued)

in that said first (25) and second (26) surfaces are arranged in such a way that, if the pressure difference between said first environment (9) and said second environment (90) remains below a predetermined value, said first thrust means (3) realizes said closed contact profile between said closure element (5) and said slider (2).

8 Claims, 6 Drawing Sheets

(52) U.S. Cl.
CPC ............... *F17C 2205/0338* (2013.01); *F17C 2205/0382* (2013.01); *F17C 2205/0394* (2013.01)

(56) References Cited

U.S. PATENT DOCUMENTS

| | | | | |
|---|---|---|---|---|
| 5,197,671 | A * | 3/1993 | Wass | F16K 17/383 137/72 |
| 5,632,297 | A * | 5/1997 | Sciullo | F16K 17/383 137/72 |
| 7,275,559 | B2 | 10/2007 | Morrison et al. | |
| 8,752,571 | B2 * | 6/2014 | Balkus, Jr. | F16K 31/025 137/72 |
| 9,004,094 | B2 * | 4/2015 | Colding-Kristensen | F16K 27/0254 137/625.48 |
| 9,529,369 | B2 * | 12/2016 | Mayr | F16K 17/26 |
| 2011/0278775 | A1 * | 11/2011 | Germano | F16K 17/196 267/64.23 |

FOREIGN PATENT DOCUMENTS

| | | |
|---|---|---|
| EP | 1521022 | 4/2005 |
| WO | WO 2009/010177 | 1/2009 |
| WO | WO 2013/076263 | 5/2013 |

OTHER PUBLICATIONS

International Search Report and the Written Opinion dated Sep. 7, 2020 From the International Searching Authority Re. Application No. PCT/IT2020/050144. (11 Pages).

Rapporto die Ricerca e l'Opinione Scritta [Search Report and the Written Opinion] dated Mar. 11, 2020 From the Ministero Dello Sviluppo Economico, Direzione Generale Sviluppo Produttivo e Competitivita, Ufficio Italiano Brevetti e Marchi Re. Application No. IT201900008637. (10 Pages).

* cited by examiner

RELEASE VALVE

RELATED APPLICATIONS

This application is a National Phase of PCT Patent Application No. PCT/IT2020/050144 having International filing date of Jun. 9, 2020, which claims the benefit of priority of Italy Patent Application No. 102019000008637 filed on Jun. 11, 2019. The contents of the above applications are all incorporated by reference as if fully set forth herein in their entirety.

FIELD AND BACKGROUND OF THE INVENTION

The present invention relates to a release valve.

More specifically, the invention relates to a safety valve, which can be used in any context, in which there is a pressurized container and it is desired to have the possibility of releasing a gas or other material, contained therein, upon reaching a pressure threshold.

In the following, reference will be made in particular to gas springs for the use in molds, but it is clear that the solution object of the present invention should not be limited to this specific use.

Furthermore, this valve has the peculiarity of being capable of functioning not only as a release valve but also as a load valve.

Similar devices are known which are already used in the most varied areas for this purpose: however, they are not exempt from defects, especially in the case of it is necessary to ensure the tightness of containers comprising multiple components, also made of different materials, and which they can be mutually sliding, therefore more susceptible to breakdowns and faults.

The gas springs available on the market generally include a pressure chamber, also called body or jacket, a stem, a guide bushing, sealing gaskets and an element for loading the gas, called a loading valve.

The value of the service pressure inside the cylinder can reach very high values, for example around 150 bar, but during compression this can reach, and sometimes even exceed, 300 bar.

During the operation it is frequent that these springs operate in environments soaked in lubricating oils and that they might enter into the chamber under pressure; being incompressible, they reduce the gas volume available in the chamber, thus increasing the maximum pressure that the spring can reach up to potentially dangerous values.

Furthermore, the pressure could also increase, due to the variation of the compression ratio between the ideal working condition and an extreme condition of extra stroke.

In order to avoid this dangerous inconvenience, in the last few years some elements have been integrated in the gas springs aimed at making them safe; in particular, solutions have been introduced to prevent the gas pressure inside the chamber from exceeding critical values.

These solutions, however, have some drawbacks, for example the fact of comprising at least two different valves, one to be used exclusively for loading the gas and another as a release valve, increasing both the overall dimensions of the same inside the springs, and their constructive complexity.

Furthermore, they are not totally reliable, since they are based on the principle that, once a certain pressure value is exceeded, it is possible to obtain structural settlements in predefined areas that causes the gas to outflow; at the moment, therefore, the possibility of carrying out corrective or maintenance interventions of the valve components is not contemplated, since they are impossible to carry out after the break and/or irreversible deformation of calibrated membranes and/or shaped elements, sized to yield at a certain pressure.

Consequently, the trigger of the safety element is linked both to the mechanical properties of the material, with which it is made of, which can also considerably vary, as well as to the tolerances connected to the production processes.

In other words, the currently available solution guarantees that at a given moment the gas spring will discharge, but at a pressure value, which is generally not identifiable from the beginning.

Another important disadvantage of these systems relates to the fact that high pressure values, although lower than the breaking pressure, can decrease not only the reliability of the chamber, but also that of other components of the spring; devices of this type, in fact, are particularly subject to fatigue break, which, as it is known, is strictly dependent on the extent and variation of the loads, to which the same devices are subjected over time.

It is clear, therefore, the need to have a solution capable of ensuring correct operation of the spring, during the whole period of its use, and which is capable of preventing the aforementioned drawbacks, without necessarily involving the breaking of one or more components upon reaching of the critical pressure.

SUMMARY OF THE INVENTION

Therefore, it is object of the invention a release valve, installable on a container intended to contain a pressurized fluid and capable of maintaining a pressure difference between a first environment and a second environment, comprising a housing, a first thrust means, a closure element, and a slider, wherein said housing contains at least said slider and said first thrust means, wherein said slider comprises a first surface facing the first environment, and a second surface, facing the second environment, and having an area greater than said first surface, wherein said closure element is interposed between said second environment and said slider, and wherein said first thrust means is positioned between said slider and said housing, so as to obtain at least one closed contact profile between said closure element and said second surface, wherein said release valve is characterized in that said fluid exerts on said second surface a pressing force greater than the pressing force exerted on said first surface, and in that said first and second surfaces are arranged in such a way that, if the pressure difference between said first environment and said second environment remains below a predetermined value, said first thrust means realizes said closed contact profile between said closure element and said slider.

This allows to drastically reduce the size of the thrust or compensation means that keep the valve closed, and consequently allows to reduce the encumbrance and size of the release valve.

Furthermore, the release valve according to the invention can include a shutter, positioned inside the slider, and a second sealing spring, constrained on a wall positioned near the first environment and obtained on the slider, and on a surface of the shutter, wherein said shutter is configured to allow the loading and/or unloading of said fluid under pressure by pressing said shutter against said second thrust means. By means of this last feature, the gas injection procedure inside the chamber becomes simpler and safer to carry out.

In addition, the closure element can include one or more channels, or through openings, capable of keeping the first environment into contact with the second environment when the pressure difference between the first and second environments exceeds the predetermined value; the presence of the openings advantageously allows the gas to exert a more uniform action on the slider when moving it.

The release valve according to the invention can also comprise sealing means interposed between the slider and the closure element; such sealing means may be necessary in order to improve the containment capacity of the valve, and may comprise, for example, polymeric seals or other suitable materials.

In a preferred embodiment, the closed contact profile previously described can be obtained on the closure element and/or on the slider; this allows to further improve the sealing of the valve, both in the absence and in the presence of additional sealing means.

Furthermore, for the same reason, the closure element itself can be made of polymeric material.

In a further variant, the release valve can comprise a first groove, a second groove, a limit and a locking means, in which the first groove is delimited at the top of the limit and is obtained on the slider in a position such as to face the second groove only when the pressure difference does not exceed the preset value, while the second groove is obtained on the internal wall of the housing; the locking means can pass from a contracted condition to an expanded condition, and is housed in at least one between the first groove and the second groove; the first and second grooves are in a reciprocal position such as to allow the locking means to pass from the contracted condition to the expanded condition only when the pressure difference exceeds the predetermined value, since the blocking means is able to create with the limit a interference such as to prevent the slider from returning to contact with the closure element.

Furthermore, the release valve can comprise sealing means for the first environment and a sealing member, such as a threaded bush and the like, integral with the slider and equipped with a sealing profile, intended to remain in contact with the sealing means when the pressure difference does not exceed the preset value and the slider is in contact with the closure element.

This advantageously simplifies the construction of the valve, its assembly and improves its performance.

Finally, it is another object of the invention a release valve which includes a loading system.

BRIEF DESCRIPTION OF THE SEVERAL VIEWS OF THE DRAWINGS

The present invention will be now described, for illustrative but not limitative purposes, according to its preferred embodiments, with particular reference to the figures of the enclosed drawings, wherein.

DESCRIPTION OF SPECIFIC EMBODIMENTS OF THE INVENTION

Figure 1:
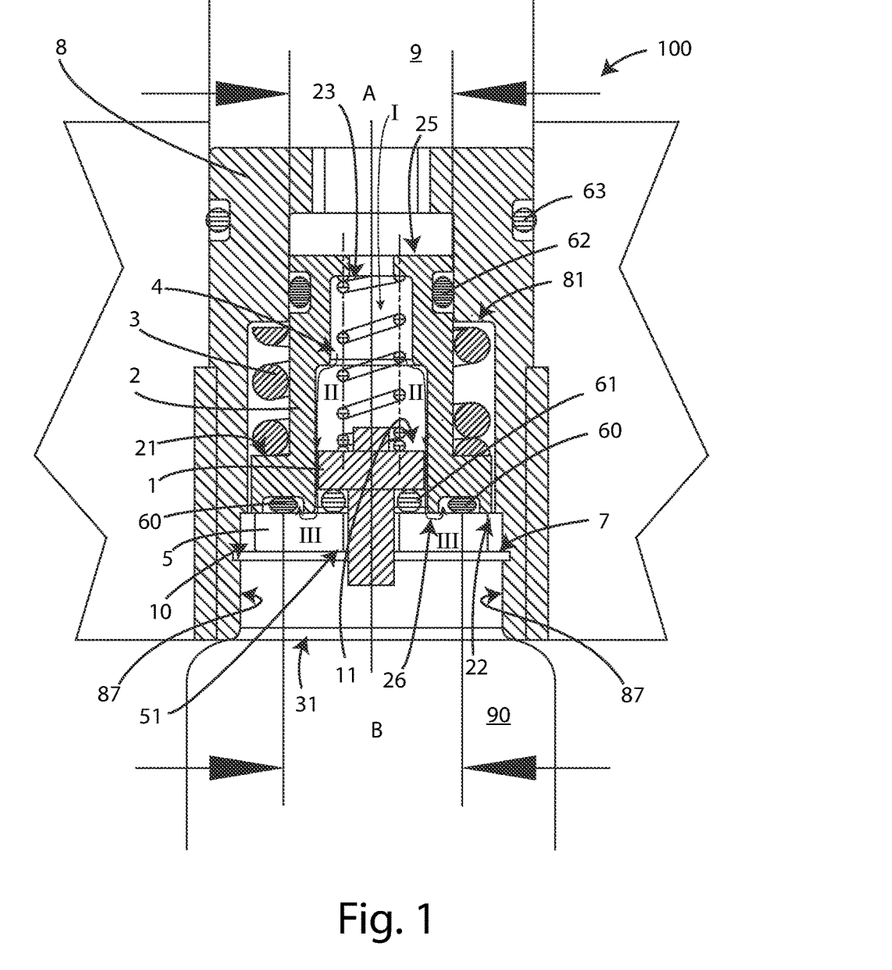
FIG. 1 is a section of a first embodiment of the release valve according to the invention, installed on the chamber of a gas spring.

With reference to FIG. 1, the different components of the release valve are visible, generally indicated by 100, and comprising:

a shutter 1 and a slider 2, slidingly coupled coaxially within a housing 8;

a first safety thrust means 3, for example a spiral spring, which encloses a section of the slider 2 and is constrained between a step 81 obtained in the housing 8, and a wall 21 of the slider 2 itself;

a second thrust means 4, for sealing, for example a spring constrained on an internal wall 23 of the slider 2 and on a surface 11 of the shutter 1;

a closing ring 5, the central opening of which can act as a further guide for the shutter 1;

a plurality of sealing means or gaskets 60, 61, 62, 63; and a stop ring 7.

In an alternative embodiment in which the shutter 1 is absent, the ring 5 can be replaced by a closure element without a central hole.

Furthermore, since the specific case of a valve applied to a chamber of a gas spring is treated, the chamber 9 of the spring itself is shown in the figures; more generally, the term chamber can be considered here as the volume or internal environment of a generic container, in which a pressurized fluid can be confined.

The valve therefore acts as a sealing element between the chamber 9 and an external environment 90.

The release valve 100 can preferably comprise the loading system, which includes for example the shutter 1 held in position by the spring 4.

In detail, an inlet section 31 can be provided, which is used to introduce the gas into the chamber 9. To carry out this operation, the sealing spring 4 is compressed, and by sliding the shutter 1 inside the cavity, the gas passes through the play between the shutter 1 itself and the internal wall of the slider 2.

When the service pressure is reached, the gas injection ends, the spring 4 is released and the shutter 1 returns to contact with the gasket 61 below. The chamber 9 is now therefore hermetically sealed, and the gas spring can be used.

This occurs thanks to the fact that the spring 3, which insists between the limit 81 of the housing 8 and the surface 21 of the slider 2, keeps the closing ring 5, the slider 2 itself, and the sealing means possibly interposed in mutual contact among them.

In service conditions, the gas contained in the chamber 9 exerts a pressure on the slider 2; more precisely, as visible in FIG. 1, the net force exerted by the gas is due to its action on a first surface 25 of the slider 2, the diameter of which is indicated with the reference A, and which faces the chamber 9 under pressure, and on a second surface 26, the diameter of which is indicated by the reference B, and which faces the external environment.

The arrows I, II, III illustrated in FIG. 1 show the path of the gas from the chamber 9 through the internal cavity of the slider 2 (I), the play between the shutter 1 and the slider 2 (II), and finally on the second surface 26 up to the seal 60 (III).

In other words, the gas, passing through the play between shutter 1 and slider 2, is able to exert a force also capable of urging the face 26 of the slider 2 itself, specifically the portion inside the contact line, between the face 26 and the sealing means 60.

Since the area of section A, relating to face 25, is smaller than the area of section B, relating to face 26, the force exerted by the gas on area B is greater than that exerted on area A; the presence of the thrust means 3, in the example acting on the limit 21 of the slider 2, compensates for this forces difference.

The spring 3 is able to oppose the axial force exerted by the gas up to a maximum pressure difference value between the environments 9 and 90, established during the design phase; the slider 2, therefore, is kept in contact with the closure element 5 until this pressure difference reaches the predetermined limit value.

More in detail, the closure element 5 can be made as a removable element, to be blocked for example by means of a stop ring 7 or the like, or it can be integrated with the internal wall of the housing 8.

Figure 6:
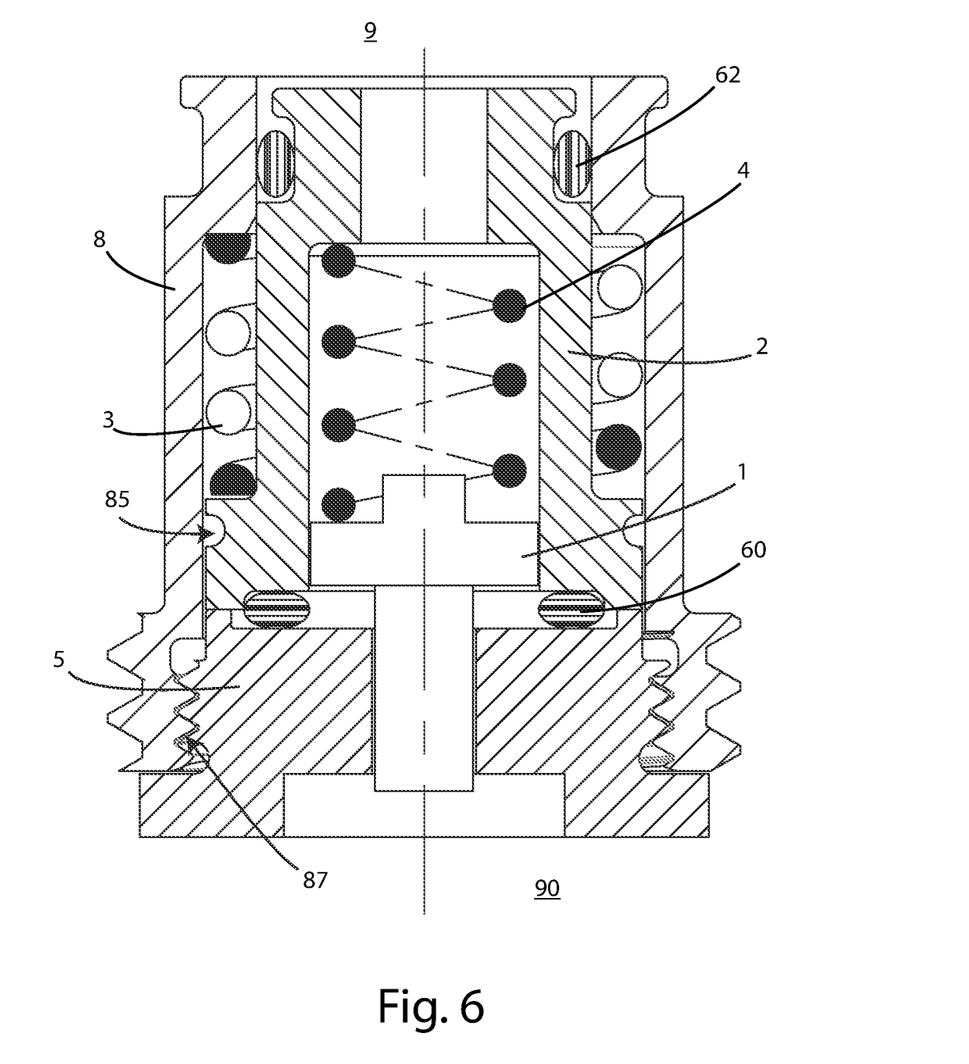
FIG. 6 shows a construction detail of an embodiment of the valve according to the invention.

Furthermore, according to the invention, the closure element 5 can be a threaded ring nut, to be engaged with a counter-thread made on the internal lower wall 87 of the housing 8, as shown in FIG. 6.

A closure element 5 thus made, allows to vary the force exerted by the spring 3, simply by screwing and unscrewing the ring nut, which will vary the size of the spring 3 itself and therefore the compression force exerted.

In the preferred embodiment shown in the attached figures, the closure element 5 has on its surface one or more through channels or openings 10, which facilitate the passage of the gas between the environments A and B.

As said, the gas contained in the environment 9 passes through the cavity of the slider 2 and exerts a force on the circular section of the surface 26 of the slider 2 itself; if the difference between the forces exerted by the gas on the faces 26 and 25 increases, for example due to an accumulation of liquids inside the chamber 9 or an excessive compression ratio between the two environments, beyond the safety value tolerable by the thrust means 3, the net force exerted on the slider 2, given by the sum of the force of the spring 3 itself and the gas forces on the faces 26 and 25, causes the slider 2 to be raised.

At this point, due to the relative separation between the slider 2 and the closure element 5, the gasket 60 interposed between them is no longer able to ensure the sealing of the environment 9; the gas and any accumulated liquid outflow through the channels 10, after having crossed the play between slider 2 and shutter 1, if this shutter 1 is present. Under these conditions, it is possible to outflow the liquid accumulated inside the chamber of the cylinder to which the valve is applied.

Figure 2:
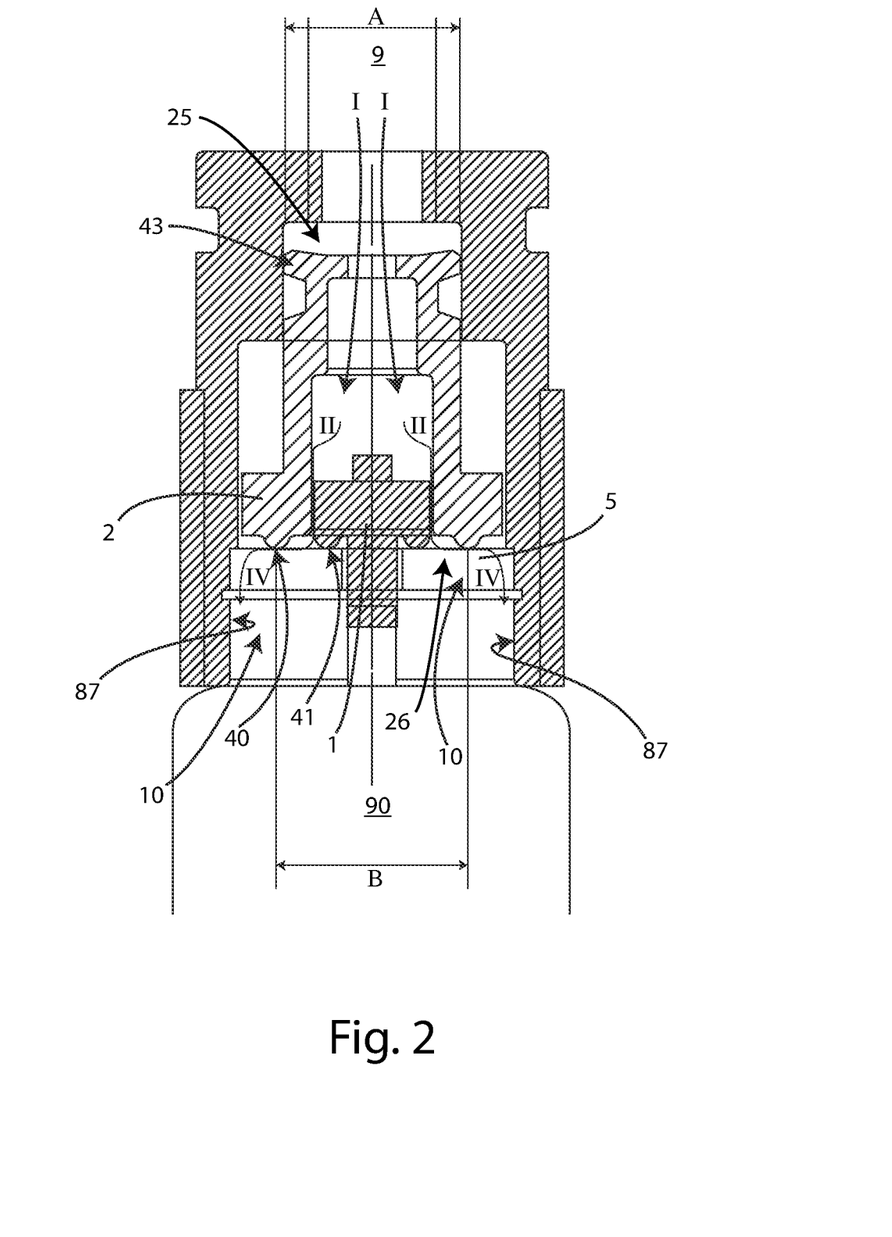
FIG. 2 is a section of a second embodiment of the release valve according to the invention.

The arrows I, II, IV shown in FIG. 2 show the path of the gas from the chamber 9 through the internal cavity of the slider 2 (I), the play between the shutter 1 and the slider 2 (II), and finally through the channels 10 (IV).

After the expulsion of the excess gas quantity, the pressure value inside the chamber returns to a safety value, and the spring 3 reposition the slider 2 in contact with the gasket 60; furthermore, if suitably positioned, the valve also allows the gas to bring with it any liquids that may be present, such as lubricating oils and the like, which could prevent the gas spring from correctly returning to function.

According to further embodiments of the release valve 100, of which an example is shown in FIG. 2, the closure element 5 can be made of a suitable polymeric material, so that it can function itself as a sealing means; alternatively, a further element made of a material suitable for guaranteeing the seal can be interposed between the slider 2 and the closure element 5, thus being able to do without the seat for the gasket 60 shown in FIG. 1.

Furthermore, as shown in FIG. 2, profiles 40, 41 can be provided, respectively obtained on the slider 2 and/or on the shutter 1 (with a semi-circular section, for example), which insist on the closure element 5 to guarantee the seal of the chamber 9; vice versa, the profiles 40 and 41 could be obtained on the closure element 5, and would insist on the slider 2 and/or on the shutter 1.

Furthermore, as shown in FIG. 2, the slider 2 can also be equipped with a lip profile 43, in its upper portion or in any case close to the chamber 9, so that it acts as an additional sealing element.

It is clear the greater convenience of the invention described so far, especially if we consider that, in addition to having better characteristics than the prior art in terms of performance and operation, its design and construction allow the simple replacement of one or more components that should break following an increase in pressure or other malfunctions in general; similar operations, in fact, are not as simple in the valves currently known.

It is also clear that the valve according to the invention is suitable for use not only in the example described of a gas spring, but also in any other application field where it is necessary to maintain a predetermined pressure difference between two connected environments from the valve itself.

Another of the main advantages of the solution described so far is that of keeping the gas spring chamber, or in any case the pressure vessel, operating even in case the pressure is risen beyond a safety value; in the systems currently used, on the contrary, the irreversible breakage of at least one component of the assembly is foreseen as a final result, which causes the total leakage of the gas and consequently renders the system unusable in its entirety.

Figure 3A:
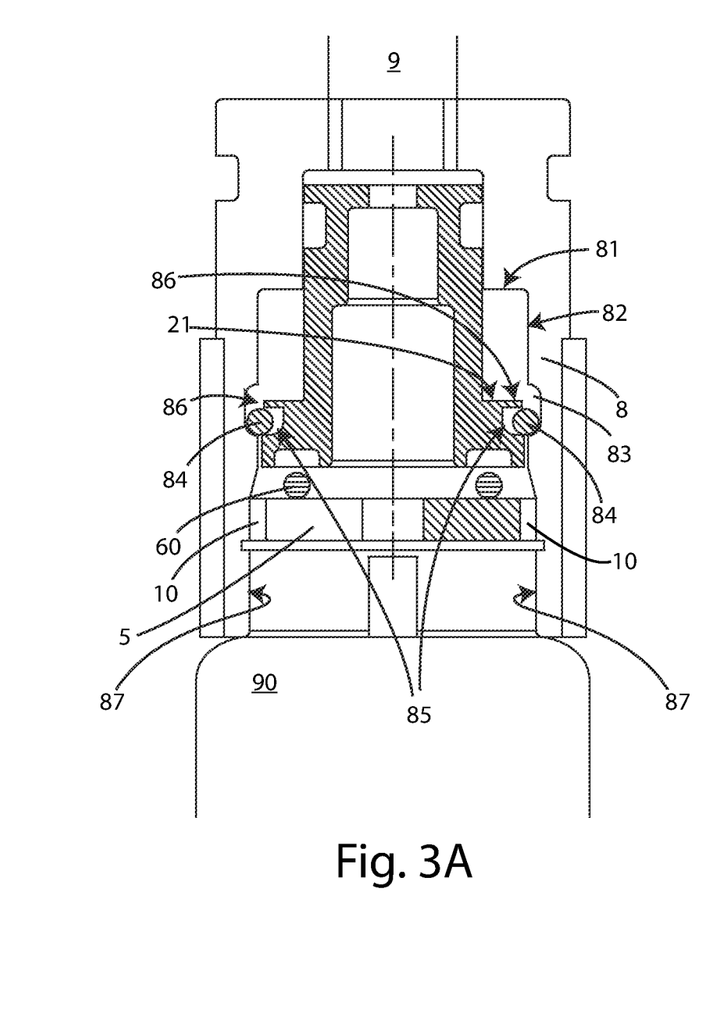
FIGS. 3A and 3B represent sections of a third embodiment of the release valve according to the invention, in two configurations, one subsequent and another preceding the escape of gas.
Figure 3B:
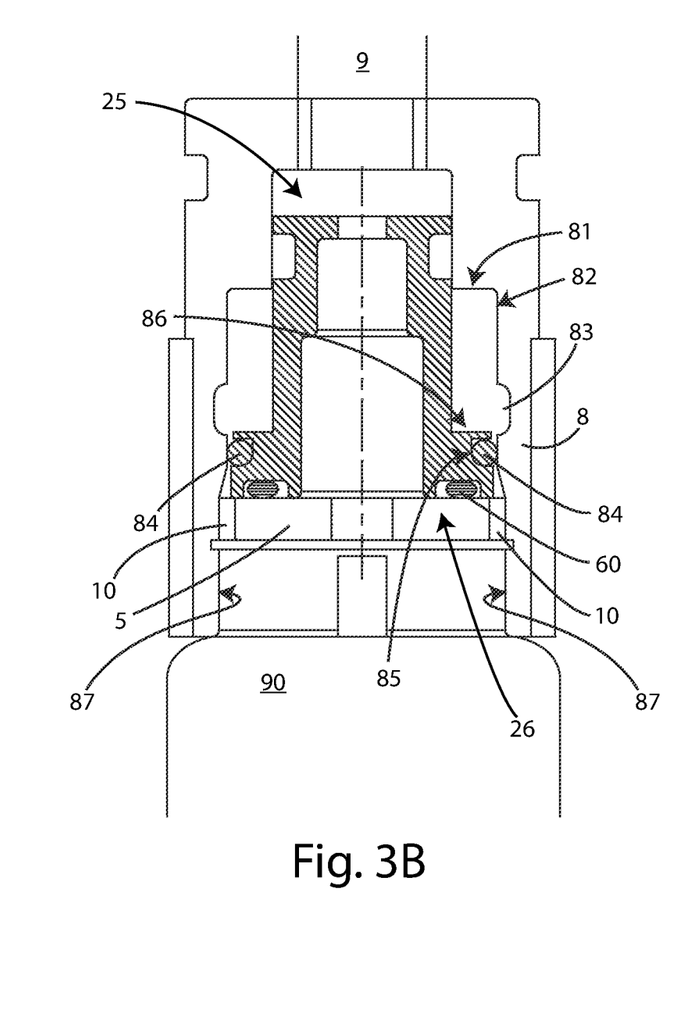

FIGS. 3A and 3B show an alternative embodiment of the release valve according to the invention: for greater simplicity, some construction details represented in the previously described variants, such as the sealing and safety springs, have not been represented.

It should be noted, however, that FIG. 3 must be interpreted considering the elements mentioned so far as being part of the present embodiment, the technical effect of which is that of allowing the complete outflow of the gas contained in the chamber upon reaching a limit pressure.

More in detail, a first groove or spline 85 is obtained on the slider 2, which in this case shown is delimited at the top by a limit 86 in the figures; on the inner wall 82 of the housing 8 it is instead obtained a second groove or spline 83.

A locking means 84 is housed inside the first groove 85, and it is at the same time in contact with the flat surface of the wall 82 itself.

The locking means 84 can be an elastic ring or in any case made of a material, for example polymeric or elastomeric, so that it is able to expand when the constraints surrounding it are removed.

Alternatively, the locking means 84 can comprise the last turn of the spring 3, shaped with a diameter greater than the average diameter of the rest of the spring 3 itself.

In particular, it passes from a contracted condition (FIG. 3B), in which its volume is limited between the walls of the first groove 85 and the wall 82, to an expanded condition (FIG. 3A), in which its volume is free to expand within the second groove 83.

The grooves 85 and 83 are positioned respectively on the slider 2 and on the wall 82, so that, while the slider 2 is in the sealing configuration (FIG. 3B), they do not face each other completely; in other words, the grooves 85 and 83 are positioned in such a way that the locking means 84 finds sufficient space to expand inside the second groove 83 only when the slider 2 reaches the release configuration.

As a result of the pressure increase, in fact, the slider 2 assumes the release configuration (FIG. 3A) and the first groove 85, dragging the locking means 84, facing the second groove 83.

At this point the containment space of the locking means 84 comprises the volume of the first groove 85 and also the volume of the second groove 83: the locking means 84, first contained by the first groove 85 and the wall 82, also expands within the second groove 83.

Once part of the gas has exited the chamber 9 and the pressure drops below the safety value, the slider 2 reverses its movement, driven by the safety spring (not shown). The locking means 84, now in the expanded condition, creates interference with the limit 86, which hits against it, preventing the return of the slider 2 to the sealing configuration; therefore the release valve does not close completely and the chamber empties itself of the gas.

Figure 4:
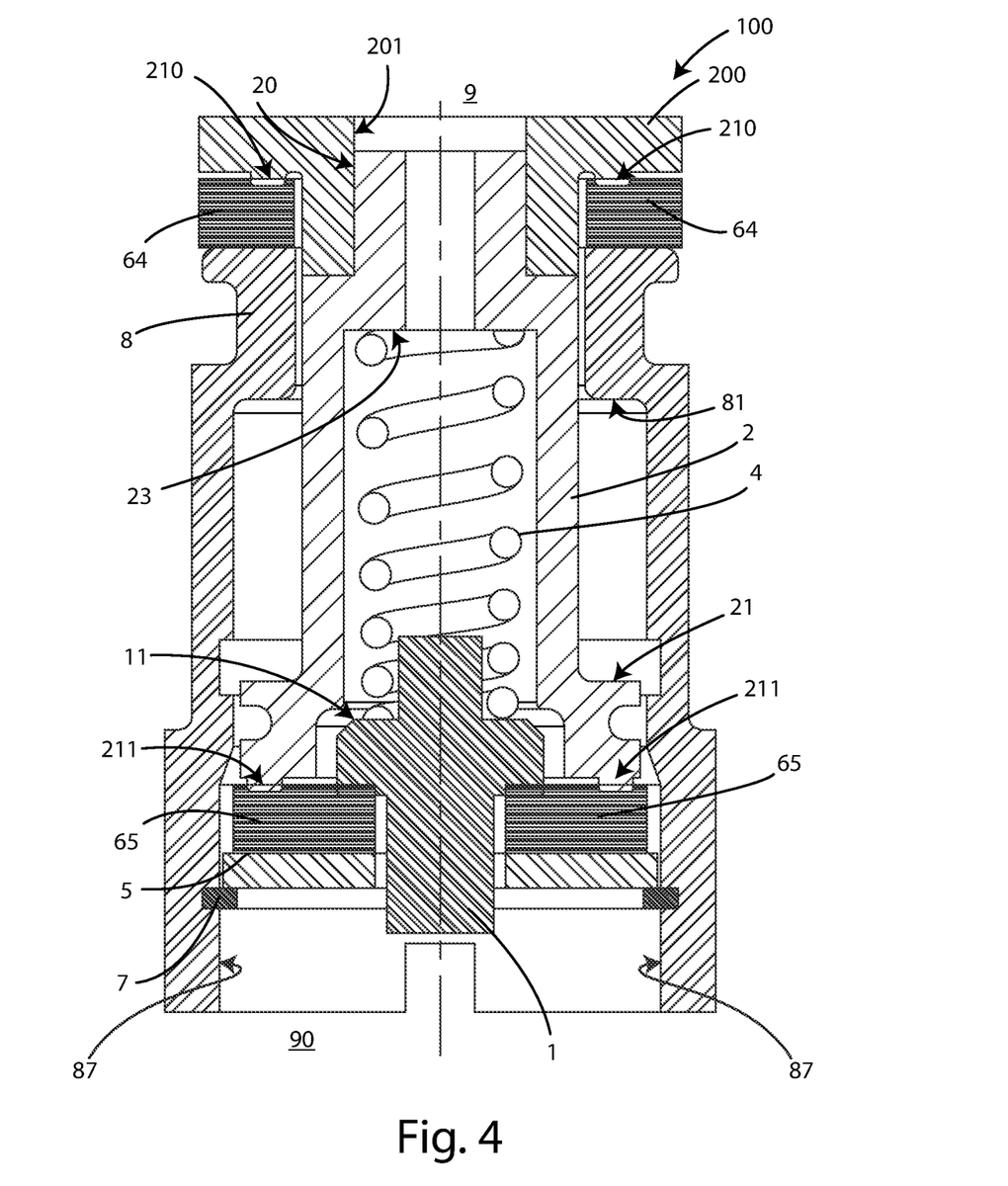
FIG. 4 represents a fourth embodiment of the release valve according to the invention.

The embodiment of FIG. 4 differs from the previous ones in the sealing methods between the slider 2 and the walls of the housing 8.

In this embodiment of the invention, the gaskets 60 and 61 shown in FIG. 1 are replaced by a single gasket 65, while the gaskets 62 and 63 present in FIG. 1 are replaced by a single gasket 64.

The thrust means 3 is not shown in FIG. 4 at issue to improve the intelligibility of the drawing.

The portion of the slider 2 which faces the room 9 is coupled to a sealing member 200, which in the embodiment shown is a threaded bush.

The threaded bush 200 can be coupled to the slider 2 during the assembly or installation of the valve 100, and is arranged to be screwed through its internal surface 201 to the external surface 20 of the slider 2, both suitably threaded.

The bush 200 is furthermore equipped with a profile 210 for contacting the sealing means 64, which in the case shown is a circular relief having a sealing function together with the sealing means 64 themselves.

Preferably, as said, in correspondence with the opposite ends of the slider 2, i.e. the one facing the environment 90, a gasket 65 can be provided, which replaces the two gaskets 60 and 61 of FIG. 1.

A profile 211, similar to the profile 210, can be obtained on the slider 2 in order to guarantee a perfect seal of the valve.

Advantageously, the shutter 1 is also in contact with the same gasket 65.

In this way it is possible to obtain through the same expedient the very significant technical improvements in the context of the invention:
 the number of pieces used is reduced, to the advantage of costs and production times, assembly and operation of the valve;
 a more effective seal is obtained, since the slider 2 realizes with the gasket 64 an axial seal, more effective and reliable than the radial seal typical of the embodiments of FIGS. 1 and 2;
 any undesirable effects due to friction between the sliding walls and the gasket itself are eliminated, for example the gluing.

Figure 5:
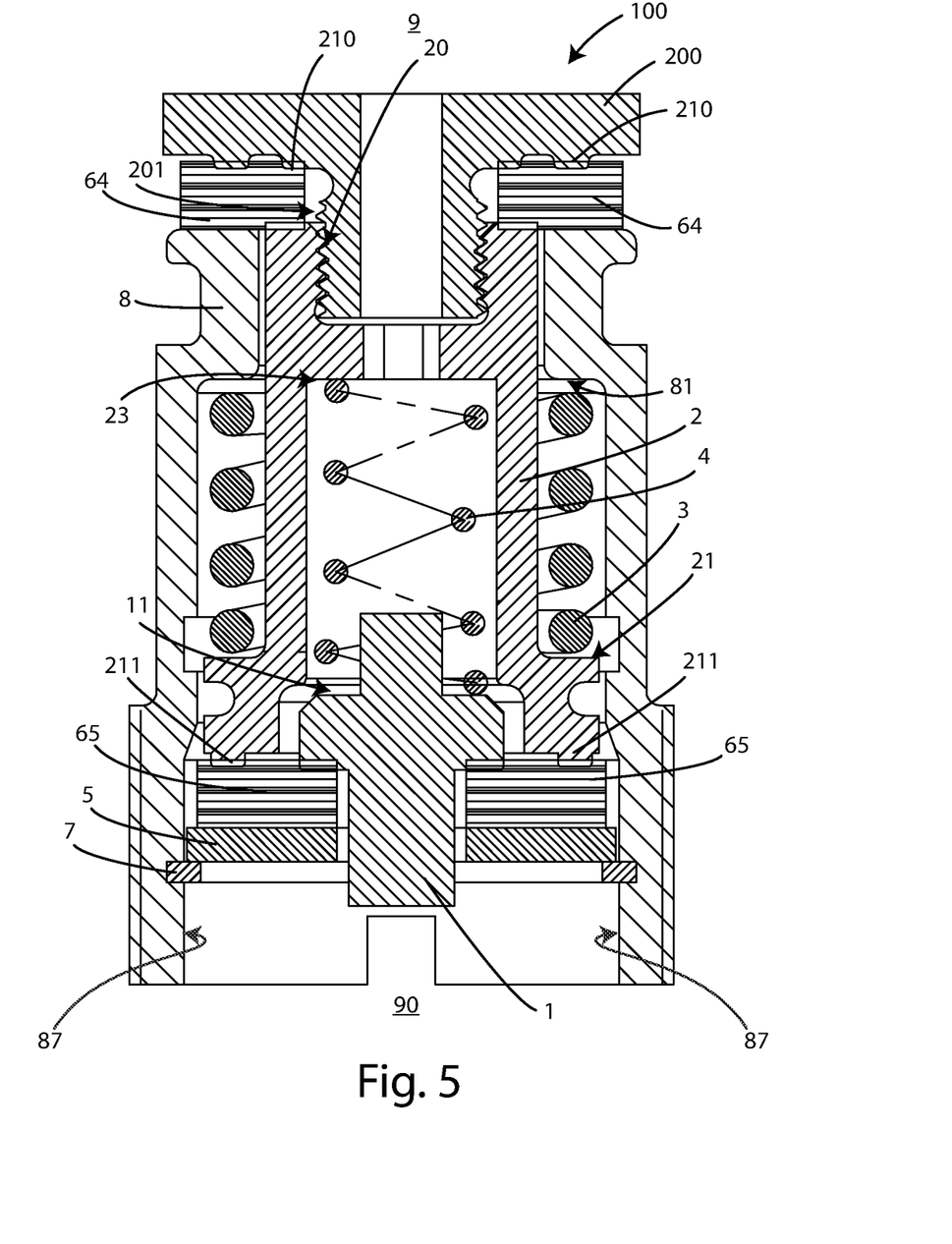
FIG. 5 represents in more detail the embodiment of the FIG. 4.

FIG. 5 shows in more detail the threaded coupling between the slider 2 and the sealing member 200.

In this case the slider 2 and the sealing member 200 are configured to be screwed respectively through the internal surface 20 belonging to the slider 2 and the external surface 201 belonging to the sealing member 200.

An advantage of the present invention is that of allowing a high miniaturization and integration of the valve.

An advantage of the present invention is also the fact that the same can be used both in gas springs for molds and for other uses, in which it is necessary to ensure a predefined maximum internal pressure.

Another advantage of the present invention is that of allowing the loading, and eventually unloading, of the fluid under pressure to regulate the pressure inside the system.

A further advantage of the present invention is that of presenting a very reduced layout in terms of sizes so as to allow a high miniaturization of the valve.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. A release valve (100), installable on a container intended to contain a pressurized fluid and capable of maintaining a pressure difference between a first environment (9) and a second environment (90), comprising a housing (8) having an internal wall (82) with an inner wall groove (83) formed thereon, a first thrust means (3), a closure element (5), and a slider (2), wherein said housing (8) contains at least said slider (2) and said first thrust means (3), wherein said slider (2) comprises a first surface (25) facing the first environment (9), and a second surface (26), facing the second environment (90), and having an area greater than said first surface (25), wherein said closure element (5) is interposed between said second environment (90) and said slider (2), and wherein said first thrust means (3) is positioned between said slider (2) and said housing (8), so as to exert a force until a predetermined safety value which maintains the slider (2) in a sealing configuration, locking means (84) mounted on the said slider for obtaining at least one closed contact profile between said closure element (5) and said second surface (26); wherein the locking means (84) finds sufficient space to expand inside the inner wall groove (83) when the slider (2) reaches a release configuration, wherein the first surface (25) and the second surface (26) are both in the first environment (9), and wherein when the force exerted by the fluid on the first surface (25) and on the second surface (26) exceeds said predetermined safety value, said slider (2) switches from the sealing configuration to the release configuration, in which the at least one closed contact profile between said closure element (5) and said second surface (26) is not obtained.

2. The release valve (100) according to claim 1, further comprising
 a shutter (1), positioned inside said slider (2), and
 a second thrust means (4), constrained on a wall (23) obtained on said slider (2) and positioned near said first environment (9), and on a surface (11) of said shutter (1), wherein said shutter (1) is configured to allow the loading and/or unloading of said fluid under pressure by pressing said shutter (1) against said second thrust means (4).

3. The release valve (100) according to claim 1, wherein said closure element (5) comprises one or more channels (10) or through openings, capable of keeping said first environment (9) in contact with said second environment (90) when said pressure difference exceeds said predetermined safety value.

4. The release valve (100) according to claim 1, further comprising sealing means (60; 65) interposed between said slider (2) and said closure element (5).

5. The release valve (100) according to claim 1, wherein said closed contact profile is obtained on said closure element (5) and/or on said slider (2).

6. The release valve (100) according to claim 1, wherein said closure element (5) is made of polymeric material.

7. A release valve (100), installable on a container intended to contain a pressurized fluid and capable of maintaining a pressure difference between a first environment (9) and a second environment (90), comprising a housing (8), a first thrust means (3), a closure element (5), and a slider (2), wherein said housing (8) contains at least said slider (2) and said first thrust means (3), wherein said slider (2) comprises a first surface (25) facing the first environment (9), and a second surface (26), facing the second environment (90), and having an area greater than said first surface (25), a first groove (85), a second groove (83), a limit (86) and a locking means (84), wherein said first groove (85) is delimited at the top by said limit (86) and is obtained on said slider (2) in a position such as to face said second groove (83) only when said pressure difference exceeds a preset safety value and the slider (2) is not in contact with the closure element (5); wherein said closure element (5) is interposed between said second environment (90) and said slider (2), and wherein said first thrust means (3) is positioned between said slider (2) and said housing (8), so as to exert a force until said preset safety value which maintains the slider (2) in a sealing configuration, in which at least one closed contact profile is obtained between said closure element (5) and said second surface (26), wherein said release valve (100) is characterized in that the first surface (25) and the second surface (26) are both in the first environment (9), and in that when the force exerted by the fluid on the first surface (25) and on the second surface (26) exceeds said preset safety value, said slider (2) switches from the sealing configuration to a release configuration, in which the at least one closed contact profile between said closure element (5) and said second surface (26) is not obtained; wherein said second groove (83) is formed on an internal wall (82) of said housing (8), and wherein said locking means (84) is adapted to pass from a contracted condition to an expanded condition and being housed in at least one of said first groove (85) and said second groove (83); wherein said first and second grooves (85, 83) are in a reciprocal position such as to allow said locking means (84) to pass from said contracted condition to said expanded condition only when said pressure difference exceeds said preset safety value and the slider (2) is not in contact with the closure element (5); and wherein said locking means (84) forms an interference with said limit (86) to prevent said slider (2) from returning to contact with said closure element (5).

8. A release valve (100), installable on a container intended to contain a pressurized fluid and capable of maintaining a pressure difference between a first environment (9) and a second environment (90), comprising a housing (8), a first thrust means (3), a closure element (5), and a slider (2), wherein said housing (8) contains at least said slider (2) and said first thrust means (3), wherein said slider (2) comprises a first surface (25) facing the first environment (9), and a second surface (26), facing the second environment (90), and having an area greater than said first surface (25), sealing means (64) for said first environment (9) and a sealing member (200) integral to said slider (2) and equipped with a sealing profile (210), intended to remain in contact with said sealing means (64) when said pressure difference does not exceed a predetermined safety value and the slider (2) is in contact with the closure element (5); wherein said closure element (5) is interposed between said second environment (90) and said slider (2), and wherein said first thrust means (3) is positioned between said slider (2) and said housing (8), so as to exert a force until said predetermined safety value which maintains the slider (2) in a sealing configuration, in which at least one closed contact profile is obtained between said closure element (5) and said second surface (26), wherein said release valve (100) is characterized in that the first surface (25) and the second surface (26) are both in the first environment (9), and in that when the force exerted by the fluid on the first surface (25) and on the second surface (26) exceeds said predetermined safety value, said slider (2) switches from the sealing configuration to a release configuration, in which the at least one closed contact profile between said closure element (5) and said second surface (26) is not obtained.

* * * * *